United States Patent

Imano et al.

[11] Patent Number: 5,826,119
[45] Date of Patent: Oct. 20, 1998

[54] SHUTTER-PRIORITY AUTOMATIC EXPOSURE CAMERA

[75] Inventors: Seiichi Imano; Kazuo Akimoto, both of Yotsukaido, Japan

[73] Assignee: Seiko Precision Inc., Japan

[21] Appl. No.: 825,351

[22] Filed: Mar. 28, 1997

[30] Foreign Application Priority Data

Mar. 29, 1996 [JP] Japan .................................. 8-077212

[51] Int. Cl.$^6$ .................................................. G03B 7/095
[52] U.S. Cl. .......................................... 396/236; 396/245
[58] Field of Search ................................. 396/236, 245, 396/257, 256

[56] References Cited

U.S. PATENT DOCUMENTS 4,383,749  5/1983  Shinoda et al. ......................... 396/245

Primary Examiner—W. B. Perkey
Attorney, Agent, or Firm—Adams & Wilks

[57] ABSTRACT

A camera operable in shutter-priority automatic exposure mode comprises a photometric circuit, an exposure data memory circuit for storing information on a plurality of selectable diaphragm openings, and a control circuit for calculating a desirable diaphragm opening based on a shutter speed preset prior to an exposure and luminance data output from the photometric circuit, and determining an actual diaphragm opening based on a comparison between the calculated diaphragm opening and the selectable diaphragm openings. The control circuit checks whether the preset shutter speed is higher or lower than a predefined reference shutter speed and selects one of the selectable diaphragm openings that provides a higher shutter speed if the preset shutter speed is higher than the reference shutter speed, or selects one of the selectable diaphragm openings that provides a lower shutter speed if the preset shutter speed is lower than the reference shutter speed.

3 Claims, 6 Drawing Sheets

SHUTTER-PRIORITY AUTOMATIC EXPOSURE CAMERA

BACKGROUND OF THE INVENTION

1. Technical Field of the Invention

The present invention pertains generally to a camera operable in shutter-priority automatic exposure mode, in which the diaphragm setting (f-stop) is determined after determining the shutter speed based on exposure data derived from luminance data, and more particularly relates to a shutter-priority automatic exposure camera whose diaphragm opening can be changed only in incremental, or decremental, steps.

2. Description of the Prior Art

Conventionally known techniques of automatic exposure control for a camera include a shutter-priority automatic exposure system. In this conventional automatic exposure system, the shutter opening size (diaphragm opening) is determined in accordance with an exposure value (EV) determined from the luminance of an object to be photographed and a shutter speed set by a photographer.

Generally, a shutter-priority automatic exposure camera offers a choice of stepwise shutter speed settings, such as $1/60$, $1/125$ and $1/250$ of a second, allowing the photographer to select a desired setting depending on his, or her, specific photographic purposes. Diaphragm opening is calculated based on the shutter speed thus set and luminance data which is output from a photometric circuit.

In a case where the diaphragm opening can be set only in discrete steps, such as f/2.8, f/5.6, f/8, f/11, f/16, and so forth, the diaphragm opening calculated as described above does not necessarily coincide with one of these stepwise diaphragm opening values, but falls between two successive adjacent of f-stops in most cases. As an example, the calculated diaphragm opening would be f/7 which lies between f/5.6 and f/8. Under these conditions, a built-in control circuit, which is provided for overall control of the camera, usually selects one of the available diaphragm settings that is nearest to the calculated diaphragm opening, calculates the shutter speed from the diaphragm setting thus selected and the exposure value, and performs an exposure based on the selected diaphragm setting and the calculated shutter speed.

The aforementioned conventional automatic exposure system, in which the diaphragm opening is set to one of the available diaphragm settings that is nearest to the calculated diaphragm opening, develops such a problem that the shutter speed is set to a lower value than the initial setting when the photographer prefers a high shutter speed, or vice versa, resulting in a failure to achieve the intended photographic purposes.

SUMMARY OF THE INVENTION

It is an object of the invention to provide a camera operable in shutter-priority automatic exposure mode which solves the aforementioned problem of the conventional shutter-priority automatic exposure system.

In a case where a desirable diaphragm opening calculated by the camera does not exactly coincide with any of actually selectable diaphragm settings, which are available only in discrete steps, the camera corrects the calculated diaphragm opening so that a photographer's specific photographic purposes are achieved. For example, a diaphragm setting that provides a higher shutter speed setting is selected if the photographer's shutter speed setting is originally intended for high-speed photography, while a diaphragm setting that provides a lower shutter speed setting is selected if the photographer's shutter speed setting is originally intended for low-speed photography.

In the camera operable in shutter-priority automatic exposure mode of this invention, opening and closing operations of opening sectors and closing sectors can be controlled independently of each other. More specifically, the opening sectors and the closing sectors are separately operated by rotary motions of a driving ring which is driven by a step motor. A control circuit is associated with a shutter speed setting circuit which allows the photographer to preset a desired shutter speed prior to each exposure. When the photographer presses a shutter release button, a photometric circuit measures the luminance of an object to be photographed and outputs luminance data to the control circuit. The control circuit calculates a desirable diaphragm opening based on the preset shutter speed and the luminance data, and determines an actual diaphragm opening based on a comparison between the calculated diaphragm opening and the selectable diaphragm settings.

To enable the photographer to take each picture in exposure conditions suited to his, or her, photographic purposes, the control circuit selects a diaphragm setting that provides a higher shutter speed if the preset shutter speed is for high-speed photography, and a diaphragm setting that provides a lower shutter speed if the preset shutter speed is for low-speed photography.

A specific reference value of shutter speed is predefined in the control circuit to allow diaphragm opening correction. The control circuit compares the photographer's shutter speed setting and the reference shutter speed to check whether the former is higher than the latter, or vice versa, and outputs a signal containing information on the result of comparison to a correction circuit.

The control circuit activates the step motor via a motor driving circuit to turn the driving ring. Since the opening sectors and the closing sectors are made operable independently of each other, the control circuit can separately control their movements by transmitting a control signal to an electromagnet driving circuit, and thereby activating an opening electromagnet and a closing electromagnet.

The above arrangement of the invention enables the photographer to always obtain exposure conditions best suited to his, or her, photographic purposes.

DETAILED DESCRIPTION OF THE PREFERRED EMBODIMENT

The invention is now described in detail with reference to a camera of a preferred embodiment which is illustrated in the attached drawings.

Figure 1:
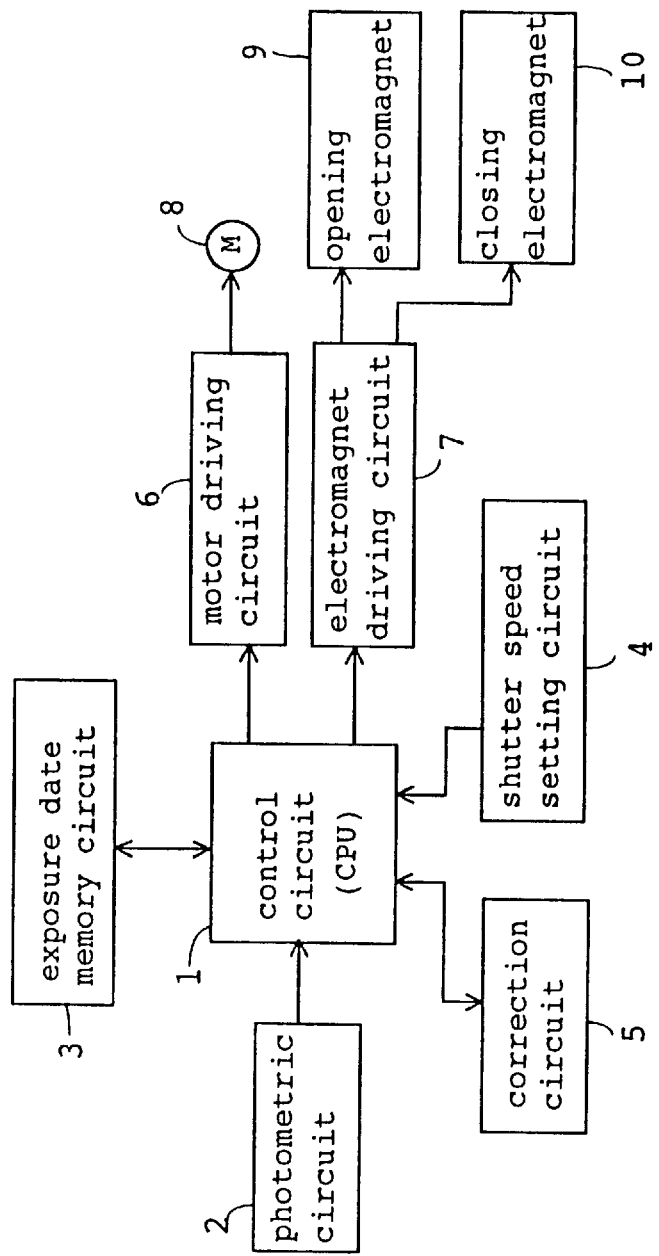
FIG. 1 is a block diagram showing the circuit configuration of a principal part of a camera according to an embodiment of the invention.

The circuit configuration of a shutter section of the camera is described at first referring to FIG. 1, which is a block diagram of circuitry concerning the shutter section according to the embodiment of the invention. It is to be noted, however, that other portions of the camera, such as a focusing device and a film take-up device, are omitted in this block diagram.

Constituting the heart of the camera in the circuit configuration shown in FIG. 1 is a control circuit 1, which is composed essentially of a central processing unit (CPU), for determining the shutter opening size. A photometric circuit 2 is connected to the control circuit 1 for entering luminance data to the control circuit 1. The luminance data is obtained by measuring the luminance of an object to be photographed and then converting it into an electrical signal.

Also connected to the control circuit 1 is an exposure data memory circuit 3 which stores information on selectable diaphragm settings, for instance, with a capability of exchanging data with the control circuit 1. In addition, a shutter speed setting circuit 4 and a correction circuit 5 are connected to the control circuit 1. The shutter speed setting circuit 4 allows a photographer to preset a desired shutter speed. The correction circuit 5 can select one of the selectable diaphragm settings so that the actual shutter speed is set to a higher or lower value than the photographer's shutter speed setting when a diaphragm opening calculated from the luminance data fed from the photometric circuit 2 and the photographer's shutter speed setting does not exactly coincide with any of the selectable diaphragm settings. In selecting, or correcting, the diaphragm opening, the correction circuit 5 selects such a diaphragm setting that results in a higher shutter speed than the photographer's shutter speed setting if the latter is higher than a specific reference value of shutter speed (e.g., $1/60$ second). On the contrary, the correction circuit 5 selects such a diaphragm setting that results in a lower shutter speed than the photographer's shutter speed setting if the latter is lower than the reference shutter speed. This approach helps prevent such inconvenience that a shutter speed lower than the preset shutter speed is selected based on the calculated diaphragm opening although the photographer's shutter speed setting was originally intended for high-speed photography. The control circuit 1 is also connected to a motor driving circuit 6 and an electromagnet driving circuit 7 in such a way that the control circuit 1 outputs driving signals to the motor driving circuit 6 and the electromagnet driving circuit 7. The motor driving circuit 6 is further connected to a later-described step motor 8 while the electromagnet driving circuit 7 is further connected to an opening electromagnet 9 and a closing electromagnet 10 which will also be described later.

Operation of the circuitry of FIG. 1 is now described. Before a photograph is taken with the camera, the shutter speed setting circuit 4 sets the camera to the shutter speed (e.g., $1/250$ second) preset by the photographer. When the photographer presses a shutter release button with the object to be photographed covered within the viewing field of a viewfinder, the photometric circuit 2 measures the luminance of the object and outputs luminance data to the control circuit 1.

The control circuit 1 calculates a desirable diaphragm opening based on the photographer's shutter speed setting and the luminance data, and determines an actual diaphragm setting based on a comparison between the calculated diaphragm opening and the information on selectable diaphragm settings stored in the exposure data memory circuit 3. Since the selectable diaphragm settings are actually numerical values defined in discrete steps, the calculated diaphragm opening rarely coincides with the selectable diaphragm settings, and usually takes a value that falls between two adjacent values of the selectable diaphragm settings. The control circuit 1 checks whether the photographer's shutter speed setting is higher or lower than the reference shutter speed and causes the correction circuit 5 to select a diaphragm setting in the aforementioned manner. Since the preset shutter speed ($1/250$ second) is higher than the reference shutter speed ($1/60$ second) in this example, the correction circuit 5 selects one of the two diaphragm settings adjacent to the calculated diaphragm opening that provides a higher shutter speed.

Figure 2A:
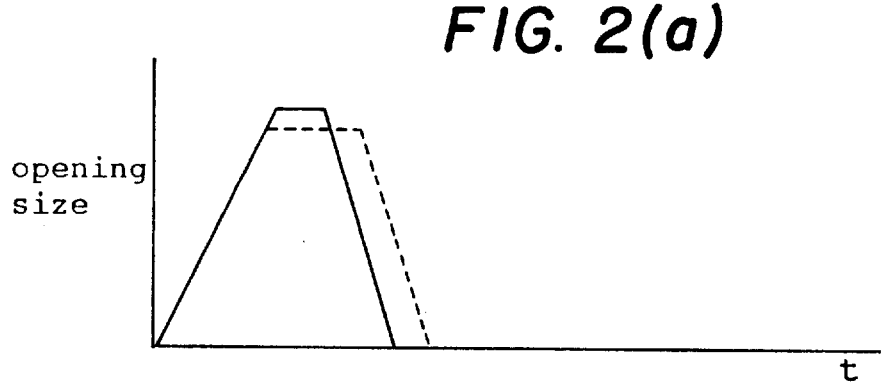
FIGS. 2(a) and 2(b) are graphs illustrating relationships between preset shutter speeds and exposure data corrections, FIG. 2(a) showing an example in which the diaphragm opening is corrected to obtain a higher shutter speed, and FIG. 2(b) showing an example in which the diaphragm opening is corrected to obtain a lower shutter speed.
Figure 2B:
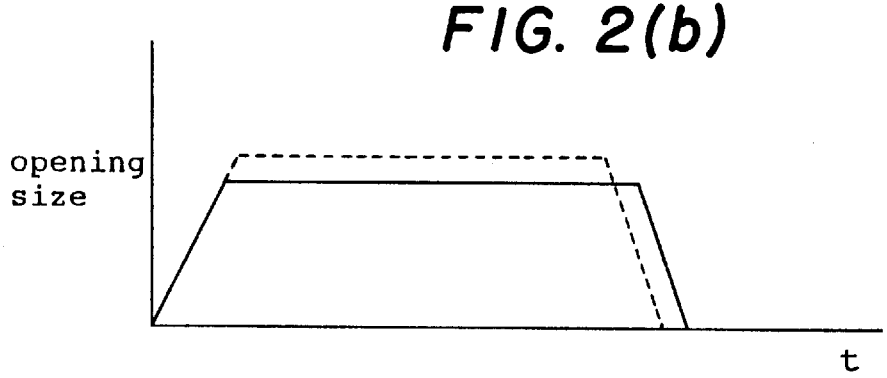

FIG. 2($a$) shows a relationship between the exposure time (t) and shutter opening size when a high shutter speed is preset. In FIG. 2($a$), broken lines represent an exposure made with the calculated diaphragm opening while solid lines represent an exposure made with the corrected diaphragm opening. Since the preset shutter speed is high in this case, the diaphragm opening is corrected to obtain a higher shutter speed. This means that the lens opening is increased and the exposure time is reduced.

Described next is the operation of the circuitry when the photographer presets a low shutter speed (e.g., $1/30$ second). When the photographer presses the shutter release button, a desirable diaphragm opening is calculated in the same way as described above for high-speed photography. The diaphragm opening is however corrected to obtain a lower shutter speed because the preset shutter speed ($1/30$ second) is lower than the reference shutter speed ($1/60$ second) in this case.

Referring to FIG. 2($b$), broken lines represent an exposure made with the calculated diaphragm opening while solid lines represent an exposure made with the corrected diaphragm opening. Since the diaphragm opening is corrected to obtain a lower shutter speed than the preset shutter speed in this case, the lens opening is made smaller than the calculated diaphragm opening and the exposure time is increased.

In determining the diaphragm opening in shutter-priority mode, the diaphragm opening is corrected to obtain a higher shutter speed in the above-described manner when the calculated diaphragm opening does not coincide with any of the selectable diaphragm settings and the preset shutter speed is higher than the reference shutter speed. On the contrary, the diaphragm opening is corrected to obtain a lower shutter speed when the calculated diaphragm opening does not coincide with any of the selectable diaphragm settings and the preset shutter speed is lower than the reference shutter speed. This arrangement enables the photographer to take each picture under such exposure conditions that are suited to specific photographic purposes. Although the reference shutter speed is set to $1/60$ second in the foregoing example, it may be set to any appropriate shutter speed, such as $1/125$ or $1/250$ second.

Referring now to FIGS. 3 to 6, the mechanical construction of the camera of the invention is described. Although not illustrated in these Figures, a shutter of the camera is provided with opening sectors for opening the shutter and closing sectors for closing it. Both the opening sectors and the closing sectors are driven by the step motor 8 (shown in FIG. 1) which is securely fixed to a base plate 11.

A rotor pinion 14 is mounted on a driving shaft 13 of a rotor 12 of the step motor 8. The rotor pinion 14 which revolves together with the rotor 12 engages an intermediate gear 15. A pinion 16 which is integrally combined with the intermediate gear 15 engages a toothed portion 17$a$ formed on part of the curved outer surface of a driving ring 17 which is mounted at the front of a lens opening L. With this construction, the driving ring 17 can be turned within a specific angle of rotation. The driving ring 17 has cam portions 17b, 17c which are formed on other portions than the toothed portion 17a, the individual cam portions 17b, 17c having varying radii of curvature.

Figure 3:
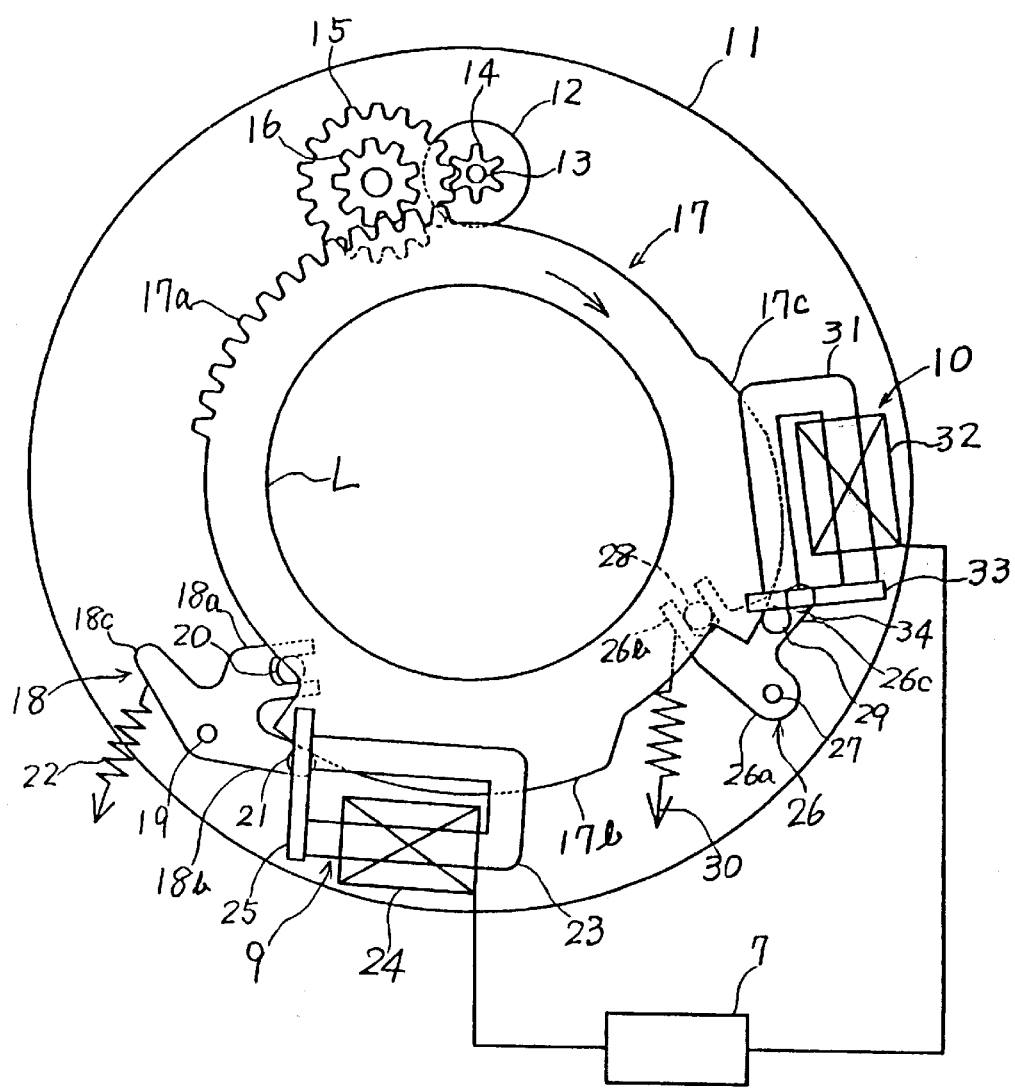
FIG. 3 is a plan view showing an initial condition of a shutter according to the embodiment of the invention.

An opening lever 18 generally having three arms is swingably mounted on the base plate 11 by means of a pivot pin 19 in the proximity of the cam portion 17b (left side as illustrated in FIG. 3) outside the driving ring 17. The opening lever 18 has in its center arm a two-prong forked portion 18a, and a driving pin 20 for activating the aforementioned opening sectors which are provided on the rear of the driving ring 17 is held between the two prongs of the forked portion 18a. At an extreme end of a right-hand arm 18b of the opening lever 18, there is provided a cam follower pin 21 which makes the opening lever 18 movable along the cam portion 17b of the driving ring 17. The opening sectors are caused to open when the opening lever 18 is turned in a counterclockwise direction. On the other hand, a biasing spring 22 is attached to an extreme end of a left-hand arm 18c of the opening lever 18 to constantly bias the opening lever 18 in the counterclockwise direction.

The opening electromagnet 9 is provided near the opening lever 18. The opening electromagnet 9 comprises a yoke 23, which is composed essentially of a generally U-shaped core, and a coil 24 wound around one of two arms of the yoke 23. There is provided an iron piece 25 formed from a soft magnetic material in contact with a far end portion of the opening electromagnet 9. The iron piece 25 is integrally linked to the cam follower pin 21. The iron piece 25 can be slid along the far end portion of the opening electromagnet 9 when the coil 24 is deenergized, by using a conventionally known mechanism. When the coil 24 is energized, the iron piece 25 is secured to the far end portion of the opening electromagnet 9 by an attractive force of the opening electromagnet 9 so that movements of the opening lever 18, and of the opening sectors, can be constrained.

Since the opening lever 18 is biased in the counterclockwise direction by the biasing spring 22, the cam follower pin 21 is held in contact with the cam portion 17b. The cam follower pin 21 can slide along the cam portion 17b at any time while the coil 24 is deenergized.

Approximately 90 degrees apart from the opening lever 18 in terms of angular deviation about the center of the driving ring 17, a closing lever 26 is swingably mounted on the base plate 11 by means of a pivot pin 27. A right-hand arm 26a of the closing lever 26 is supported by the pivot pin 27. A two-prong forked portion 26b is formed on the right side of the closing lever 26, and a driving pin 28 for activating the closing sectors is held between the two prongs of the forked portion 26b. With this configuration, the closing sectors are caused to close when the closing lever 26 is turned counterclockwise. A biasing spring 30 is attached to the forked portion 26b of the closing lever 26 to bias the closing lever 26 in the counterclockwise direction. Provided approximately in the middle of a center arm 26c of the closing lever 26 is a cam follower pin 29 which makes the cam follower pin 29 movable along the cam portion 17c of the driving ring 17.

The closing electromagnet 10 is provided on the outside of, but partly overlapping with, the cam portion 17c, along which the closing lever 26 moves in a similar way to what has been described with reference to the opening lever 18. The closing electromagnet 10 has a similar construction to the opening electromagnet 9. Specifically, the closing electromagnet 10 is composed essentially of a yoke 31 and a coil 32, and an iron piece 33 which is slidable when the closing electromagnet 10 is deenergized is attached to a far end of the closing electromagnet 10. This iron piece 33 is linked to an extreme end of the center arm 26c of the closing lever 26 by a connecting pin 34, and can constrain movements of the closing lever 26, and of the closing sectors, when the closing lever 26 is energized. The electromagnet driving circuit 7 which will be discussed later controls power supply to the coils 24, 32 of the individual electromagnets 9, 10.

Shutter operation according to the present embodiment is now described. FIG. 3 is a plan view showing an initial condition of the shutter of the embodiment. In this condition, the coils 24, 32 of the individual electromagnets 9, 10 are deenergized. Since the opening lever 18 and the closing lever 26 are in contact with bulging surfaces of the cam portion 17b and the cam portion 17c, respectively, the opening sectors are closed while the closing sectors are opened to a maximum diameter. The lens opening is therefore closed as a whole in this condition.

Figure 4:
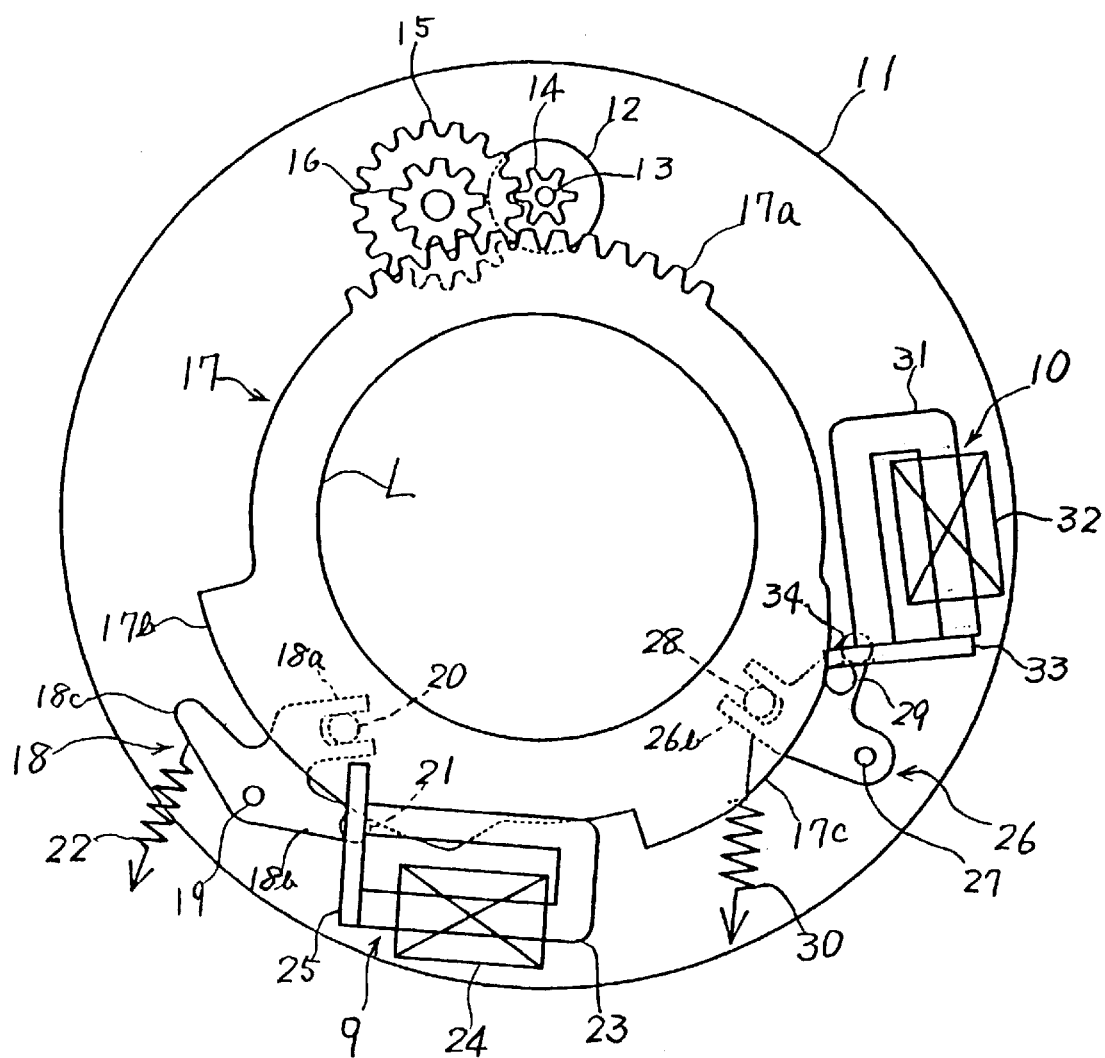
FIG. 4 is a plan view showing a condition in which the diaphragm opening is being set.

If the photographer presets a desired shutter speed and presses the shutter release button, the control circuit 1 calculates an optimum diaphragm opening based on information fed from the photometric circuit 2 and the preset shutter speed, judges whether the preset shutter speed is intended for a high-speed shooting or low-speed shooting. The control circuit 1 then corrects the diaphragm opening to obtain a higher shutter speed in the case of high-speed shooting, a lower shutter speed in the case of low-speed shooting. Then, the rotor 12 is turned clockwise by the step motor 8 and the driving ring 17 is caused to rotate in its forward direction by way of the rotor pinion 14, the intermediate gear 15 and the pinion 16. As a result, the closing lever 26 turns counterclockwise along the cam portion 17c, causing the closing sectors to gradually close. When the driving ring 17 has turned up to a point where a specified diaphragm opening is obtained, the coil 32 is energized to constrain the closing lever 26 and thereby complete diaphragm setting. The opening sectors remain in their closed position while the opening lever 18 is moving along the outermost bulging surface of the cam portion 17b. The coil 24 is energized at the same time with the coil 32 to constrain the opening lever 18 in position (FIG. 4).

Figure 5:
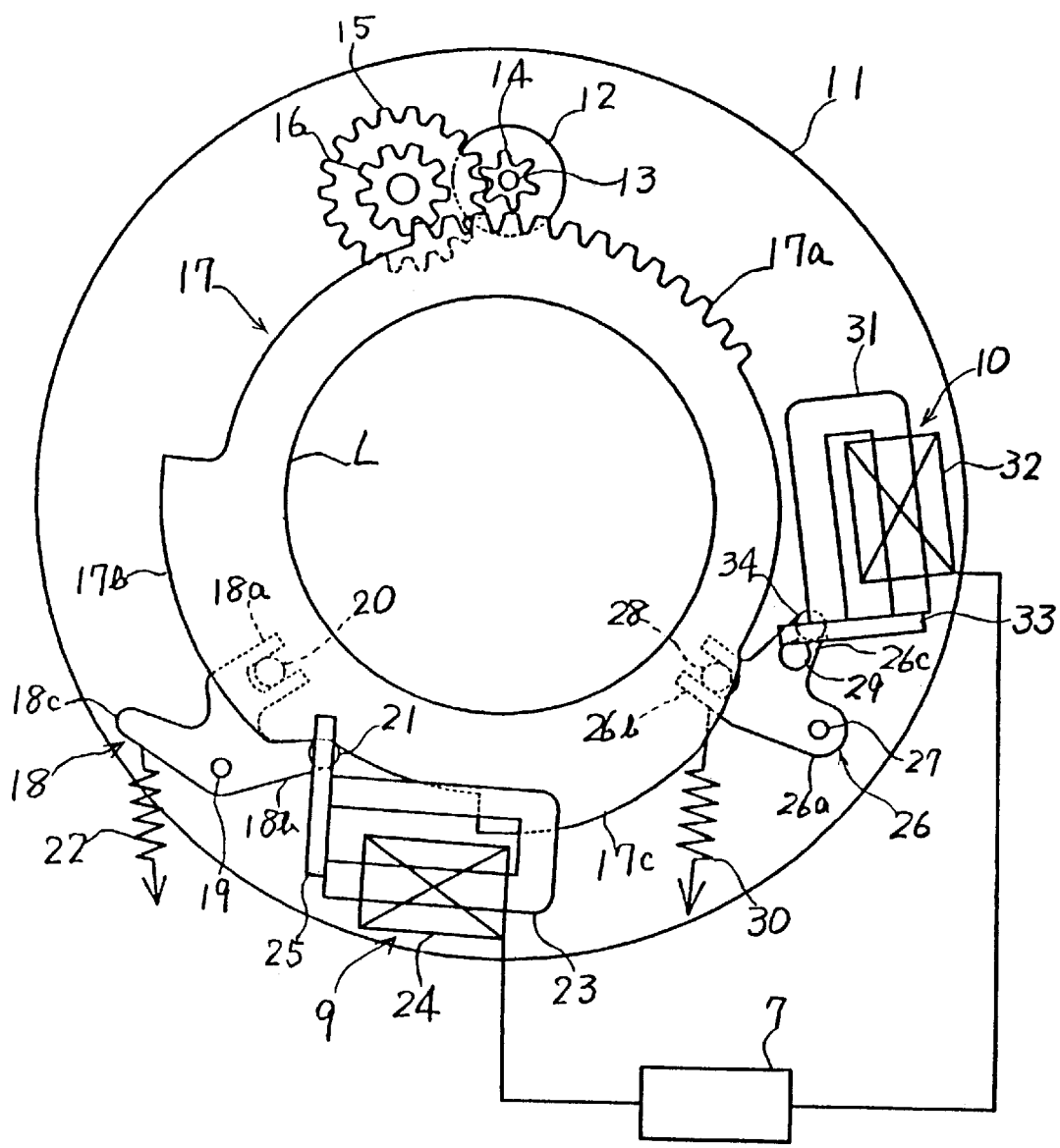
FIG. 5 is a plan view showing a condition in which the opening sectors are in an opened position.

As the driving ring 17 rotates further in its forward direction, the cam follower pin 21 attached to the opening lever 18 eventually reaches an extreme end of the sloping surface of the cam portion 17b. The coil 24 is deenergized at this point, and the biasing spring 22 causes the opening lever 18 to instantly turn in its counterclockwise direction so that the opening sectors are fully opened (FIG. 5).

Figure 6:
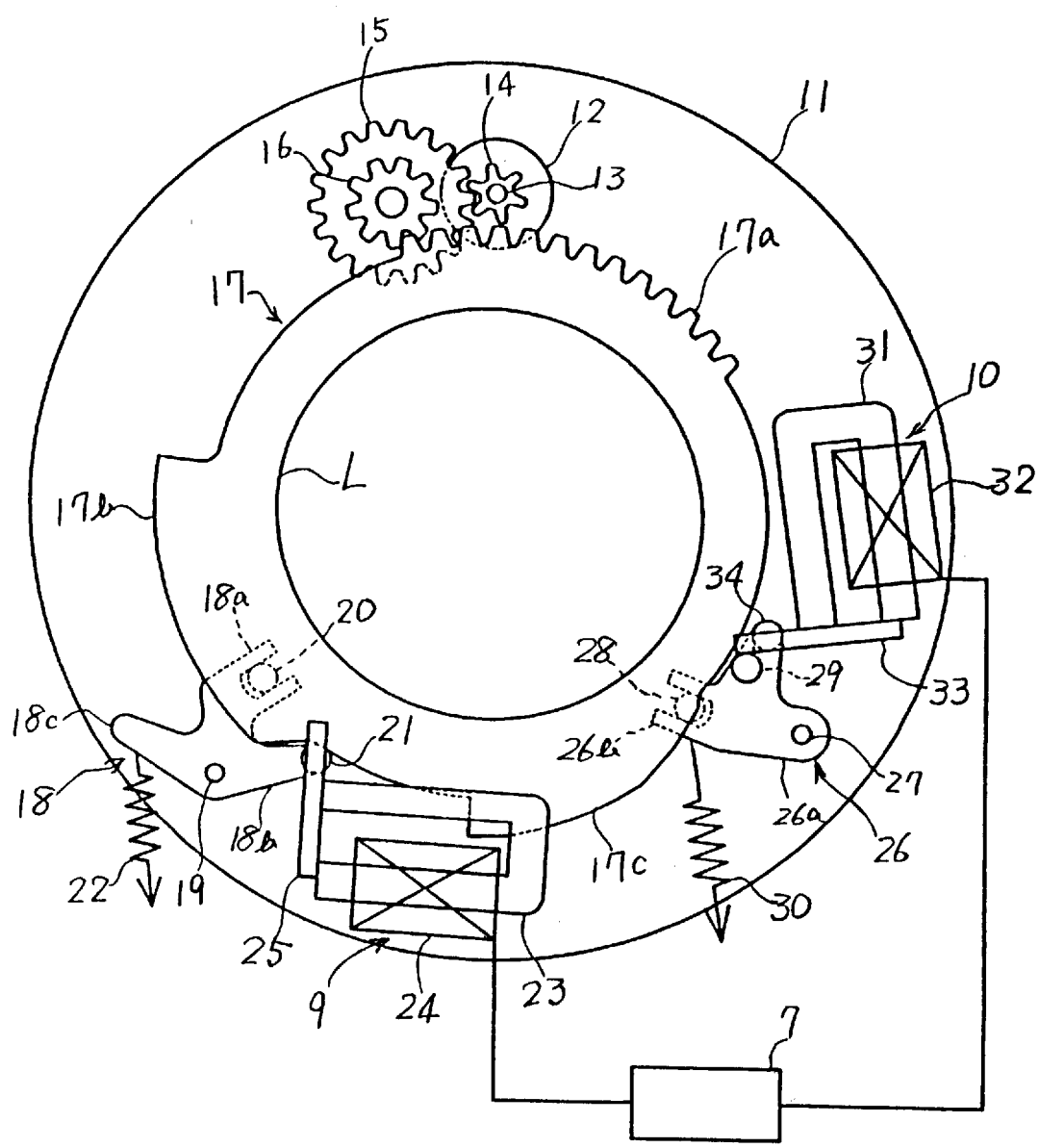
FIG. 6 is a plan view showing a condition in which the closing sectors are in a closed position.

The coil 32 is deenergized after a specified period of time has elapsed, and the biasing spring 30 causes the closing lever 26 to instantly turn in its counterclockwise direction so that the closing sectors are closed and an exposure is finished (FIG. 6).

As the driving ring 17 is turned in the opposite (counterclockwise) direction subsequently, the cam portion 17b causes the opening lever 18 to rotate clockwise and the opening sectors to be closed. On the other hand, the cam portion 17c causes the closing lever 26 to rotate clockwise and the closing sectors to be opened. When the shutter has resumed its initial condition depicted in FIG. 4, the driving ring 17 is stopped and the shutter is kept ready for a next exposure.

What is claimed is:

1. A camera operable in shutter-priority automatic exposure mode, comprising:

a photometric circuit;

an exposure data memory circuit for storing information on a plurality of selectable diaphragm openings; and a control circuit for calculating a desirable diaphragm opening based on a shutter speed preset prior to an exposure and luminance data output from the photometric circuit, and determining an actual diaphragm opening based on a comparison between the calculated diaphragm opening and the selectable diaphragm openings;

wherein the control circuit checks whether the preset shutter speed is higher or lower than a predefined reference shutter speed and selects one of the selectable diaphragm openings that provides a higher shutter speed if the preset shutter speed is higher than the reference shutter speed, or selects one of the selectable diaphragm openings that provides a lower shutter speed if the preset shutter speed is lower than the reference shutter speed.

2. A camera for operation in a shutter-priority automatic exposure mode, comprising: a photometric circuit for measuring luminance of an object to be photographed and outputting luminance data representative of the measured luminance; an exposure data memory circuit for storing a plurality of preselected diaphragm openings for an exposure operation; a shutter speed setting circuit for setting a preselected shutter speed during the exposure operation; a control circuit for calculating a diaphragm opening based on the preselected shutter speed set by the shutter speed setting circuit and luminance data outputted by the photometric signal and corresponding to the measured luminance, and determining an actual diaphragm opening for the exposure operation based on a comparison between the calculated diaphragm opening and the plurality of preselected diaphragm openings stored in the exposure data memory circuit; and a correction circuit connected to the control circuit for correcting the diaphragm opening calculated by the control circuit; wherein when the diaphragm opening calculated by the control circuit does not coincide exactly with any of the plurality of the preselected diaphragm openings stored in the exposure data memory circuit during determination of the actual diaphragm opening by the control circuit, the control circuit checks whether the preselected shutter speed is higher or lower than a predefined reference shutter speed, and the correction circuit corrects the diaphragm opening by selecting one of the plurality of preselected diaphragm openings which provides a higher shutter speed if the preselected shutter speed is higher than the reference shutter speed, or by selecting one of the plurality of preselected diaphragm openings which provides a lower shutter speed if the preselected shutter speed is lower than the reference shutter speed.

3. A camera comprising: measuring means for measuring luminance of an object to be photographed during an exposure operation and outputting luminance data representative of the measured luminance; storing means for storing a plurality of preselected diaphragm settings for the exposure operation; setting means for setting a preselected shutter speed for the exposure operation; and control means for calculating a diaphragm setting during the exposure operation on the basis of the preselected shutter speed and the luminance data outputted by the measuring means, comparing the calculated diaphragm setting with the preselected diaphragm settings, correcting the calculated diaphragm setting if the calculated diaphragm setting does not coincide exactly with one of the preselected diaphragm settings, and checking whether the preselected shutter speed is higher or lower than a predefined reference shutter speed; wherein during correction of the calculated diaphragm setting, the control means selects one of the preselected diaphragm settings which provides a higher shutter speed if the preselected shutter speed is higher than the reference shutter speed, and selects one of the preselected diaphragm settings which provides a lower shutter speed if the preselected shutter speed is lower than the reference shutter speed.

* * * * *